US012562974B2

(12) United States Patent
Pinho et al.

(10) Patent No.: US 12,562,974 B2
(45) Date of Patent: Feb. 24, 2026

(54) SYNTHETIC INFRASTRUCTURE TOPOLOGIES FOR GRAPH WORKLOAD PLACEMENT SIMULATIONS

(71) Applicant: Dell Products L.P., Round Rock, TX (US)

(72) Inventors: Rômulo Teixeira de Abreu Pinho, Niterói (BR); Paulo de Figueiredo Pires, Niterói (BR); Vinicius Michel Gottin, Rio de Janeiro (BR); Alessandro Aparecido Milan, Poços de Caldas (BR); Aldo Eliades Fernández Pérez, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/642,921

(22) Filed: Apr. 23, 2024

(65) Prior Publication Data

US 2025/0330412 A1 Oct. 23, 2025

(51) Int. Cl.
*H04L 43/50* (2022.01)
*H04L 41/12* (2022.01)
*H04L 41/14* (2022.01)
(52) U.S. Cl.
CPC .............. *H04L 43/50* (2013.01); *H04L 41/12* (2013.01); *H04L 41/145* (2013.01)

(58) Field of Classification Search
CPC ...... G06F 9/505; G06F 9/5072; G06F 9/5077; G06N 20/00; G06N 5/022; G06N 7/01; H04L 41/0894; H04L 41/12; H04L 41/14; H04L 41/145; H04L 41/16; H04L 41/40; H04L 41/5003; H04L 41/5006; H04L 41/5009; H04L 41/5019; H04L 41/5054; H04L 43/08; H04L 43/20; H04L 43/50; H04L 67/10
See application file for complete search history.

(56) References Cited

U.S. PATENT DOCUMENTS

| | | | |
|---|---|---|---|
| 2010/0199130 A1* | 8/2010 | Rolia | G06F 11/3688 |
| | | | 714/E11.178 |
| 2021/0149734 A1* | 5/2021 | Gurfinkel | G06F 9/4843 |
| 2025/0117256 A1* | 4/2025 | Romero | G06F 9/5027 |

FOREIGN PATENT DOCUMENTS

| | | | | |
|---|---|---|---|---|
| TW | 202127249 A | * | 7/2021 | G06F 9/505 |

* cited by examiner

*Primary Examiner* — Christopher Biagini
(74) *Attorney, Agent, or Firm* — Workman Nydegger

(57) ABSTRACT

Techniques for simulating and testing infrastructure are disclosed. A service accesses a first workload comprising a set of tasks. The service builds a synthetic network infrastructure based on the first workload. The service finds at least one sub-graph within the synthetic network topology that has a same topology as the first seed graph. The service then allocates network resources associated with the at least one sub-graph to test the first workload.

20 Claims, 8 Drawing Sheets

Architecture
100

Architecture
100

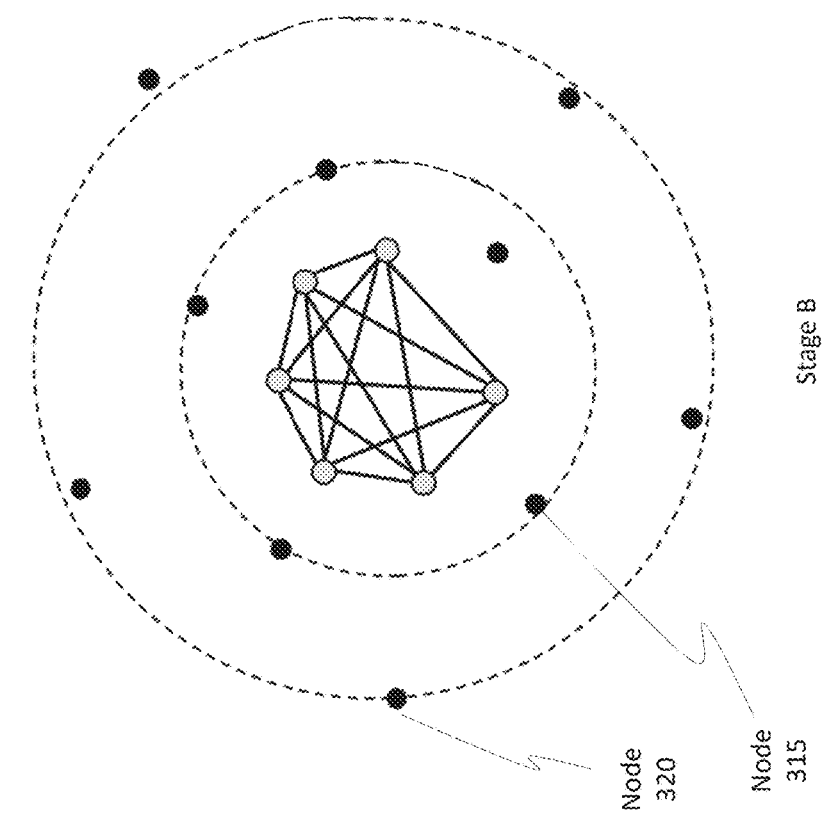
Node
320
Node
315
Stage B
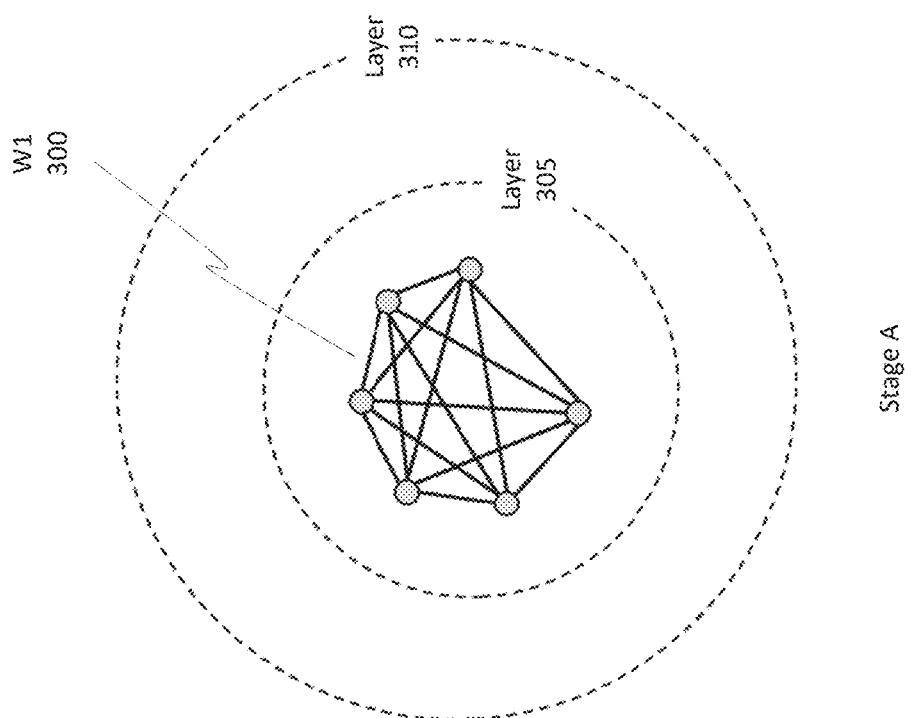
W1
300
Layer
310
Layer
305
Stage A
*Figure 3A*

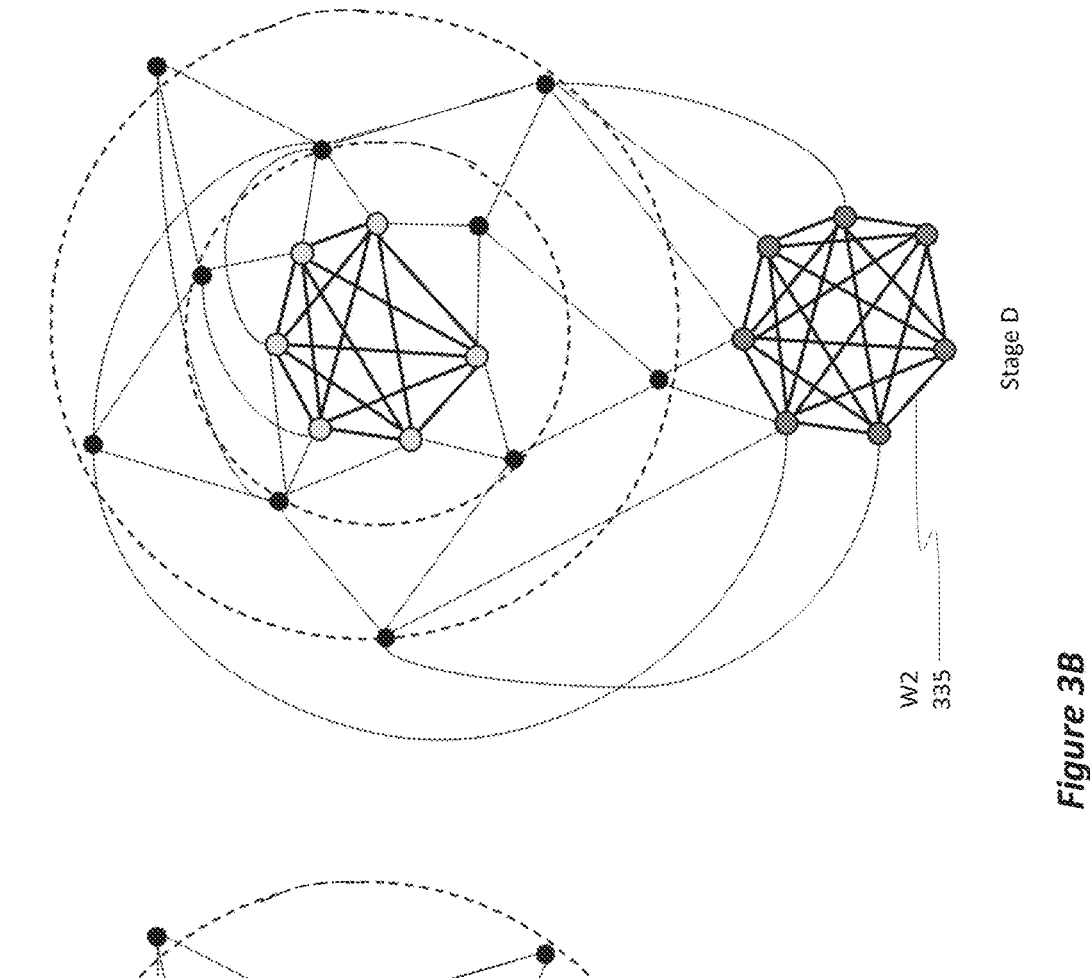
W2
335
Stage D
*Figure 3B*
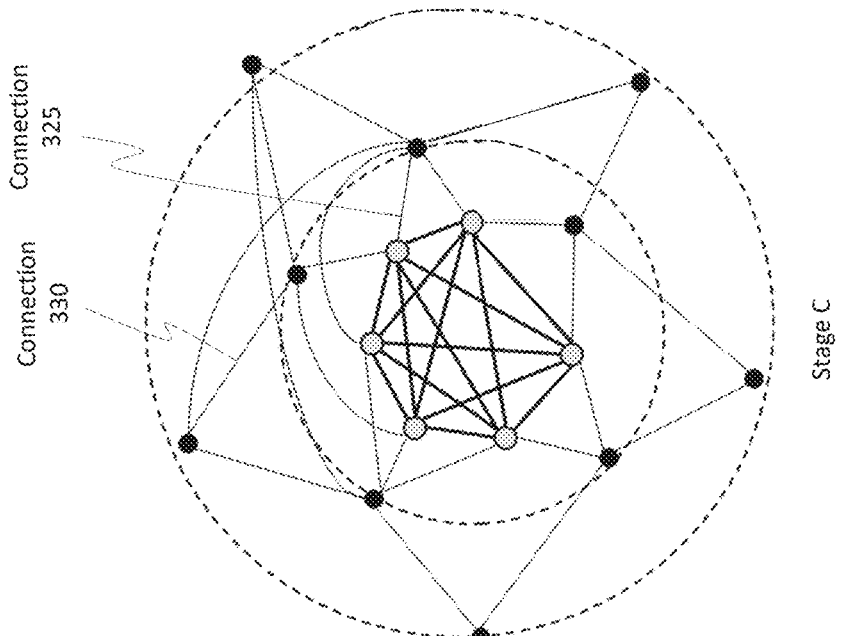
Connection
325
Connection
330
Stage C Seed Frequencies
400

500

Access A First Workload Comprising A Set Of Tasks ⟋⟍ 505

Build A Synthetic Network Infrastructure Based On The First Workload ⟋⟍ 510

Find At Least One Sub-graph Within The Synthetic Network Topology That Has A Same Topology As The First Seed Graph ⟋⟍ 515

Allocate Network Resources Associated With The At Least One Sub-graph To Test The First Workload ⟋⟍ 520

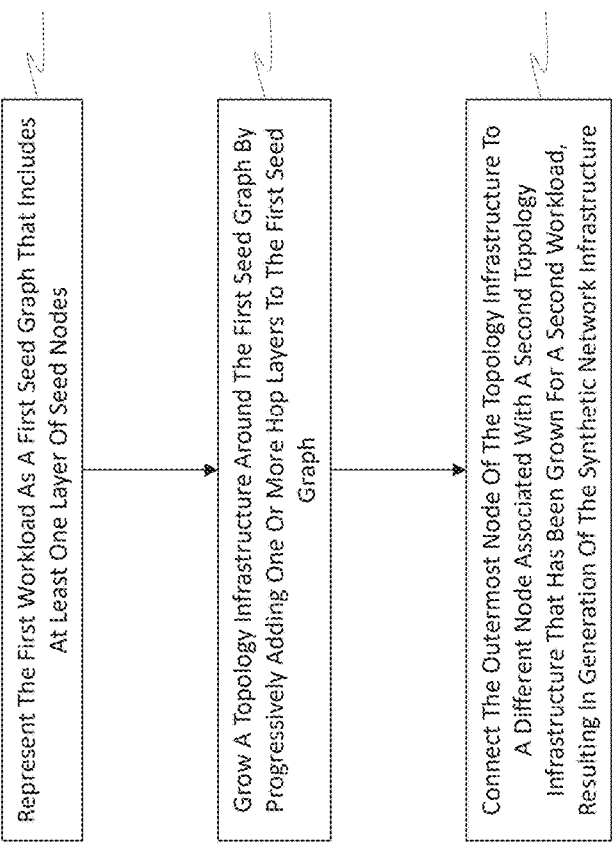

600

Represent The First Workload As A First Seed Graph That Includes At Least One Layer Of Seed Nodes — 605

Grow A Topology Infrastructure Around The First Seed Graph By Progressively Adding One Or More Hop Layers To The First Seed Graph — 610

Connect The Outermost Node Of The Topology Infrastructure To A Different Node Associated With A Second Topology Infrastructure That Has Been Grown For A Second Workload, Resulting In Generation Of The Synthetic Network Infrastructure — 615

Memory
705

NVRAM
710

Processor
715

Storage Media
720

UI Device
725

Data Storage
730

Application(s)
735

SYNTHETIC INFRASTRUCTURE TOPOLOGIES FOR GRAPH WORKLOAD PLACEMENT SIMULATIONS

COPYRIGHT AND MASK WORK NOTICE

TECHNOLOGICAL FIELD OF THE DISCLOSURE

Embodiments disclosed herein generally relate to building and testing network infrastructure. More particularly, at least some embodiments relate to systems, hardware, software, computer-readable media, and methods for generating a synthetic network infrastructure structured to test workloads.

BACKGROUND

Optimal resource allocation is a well-known problem in computational infrastructure management of as-a-service models. While resource usage of workloads is often very dynamic, determining where to start the execution (i.e., the placement) of a workload in the available infrastructure is a challenge when attempting to satisfy service level agreements (SLA). One area that has been attracting attention lately is that of intelligent workload placement across a network core, a cloud, and/or an edge infrastructure.

Graphs are a natural representation for both workflows as well as for information technology (IT) infrastructures. In effect, algorithms using graphs have been used extensively for the optimization of workflow executions and network management. Graph algorithms (e.g., that predict which node or subgraph of an infrastructure topology graph is more appropriate for running a certain workload under SLA constraints) will thus play a role in the decision of where to run what task efficiently. Given the potential large scale of the above types of infrastructure graphs and the complexity of microservice-based workflow graphs, storing and querying the graph data efficiently at scale and distributed is of particular relevance.

Nevertheless, a significant challenge in the development of new graph-based placement algorithms is how to test them at scale and in a controlled scenario. Despite the existence of cloud and network simulation tools, defining a large infrastructure for the simulation remains a manual and daunting task that is prone to errors. Although public datasets are available where one can find the execution of several workloads on different types of infrastructures, tailoring those datasets for the types of workloads and infrastructures of a specific problem has been very difficult.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings.

Understanding that these drawings depict only typical embodiments and are not therefore to be considered to be limiting of the scope of this disclosure, embodiments will be described and explained with additional specificity and detail through the use of the accompanying drawings.

FIGS. 3A and 3B further illustrate how to build a network infrastructure.

FIG. 6 illustrates an example method for building a network infrastructure.

DETAILED DESCRIPTION

As mentioned, a big challenge in the development of new graph-based placement algorithms is how to test them at scale and in a controlled scenario. Despite the existence of cloud and network simulation tools, defining a large infrastructure for the simulation remains a manual and daunting task that is prone to errors. Although public datasets are available where one can find the execution of several workloads on different types of infrastructures, tailoring those datasets for the types of workloads and infrastructures of a specific problem is very difficult.

The disclosed embodiments are directed to significant improvements, benefits, advantages, and practical applications in how infrastructure is built and simulated. In particular, the disclosed embodiments address the above problems by beneficially presenting an infrastructure topology simulation tool tailored for the problem of graph-based workload placement. The disclosed solutions are based on a graph-growing approach that starts from graph-based workload oriented seeds. By performing the disclosed operations, the embodiments advantageously have finer control over which behaviors to expect from workload placement algorithms.

Although many network and cloud simulation tools exist, creating the topology to be simulated has, to date, remained a manual task. Also, to date, there have not been any workable solutions that tailor the creation of the topology with the intent of assessing graph-based workload placement algorithms.

One aspect of the disclosed embodiments is to run a type of graph growing algorithm that starts from seeds corresponding to graph-based workloads. For each seed, the algorithm determines how many layers of additional nodes (i.e., hops) are to be added to the graph and how many nodes each layer is to have. Beneficially, the algorithm also considers the rate of connectivity (i.e., number of edges) between seeds and layer nodes. Accordingly, these and numerous other benefits will now be described in more detail throughout the remaining sections of this disclosure.

Example Architectures

Figure 1:
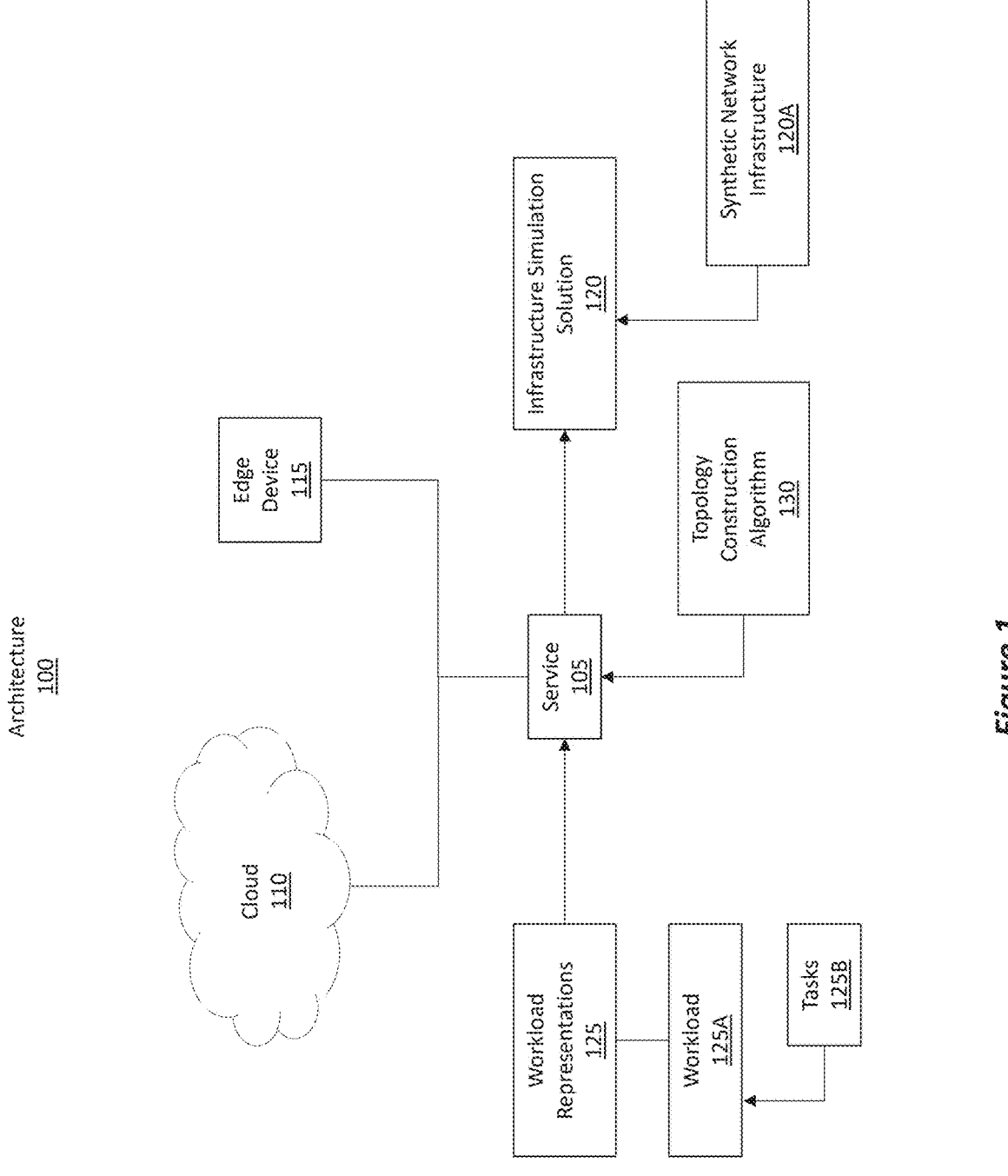
FIG. 1 illustrates an example computing architecture that can be configured to generate a synthetic network infrastructure.

Having just described some of the high-level benefits, advantages, and practical applications provided by the disclosed embodiments, attention will now be directed to FIG. 1, which illustrates an example architecture 100 in which the disclosed principles may be employed. Architecture 100 shows a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud 110 environment. In some cases, service 105 is a local service operating on a local device, such as an edge device 115. In some implementations, service 105 is a hybrid service that includes a cloud component operating in the cloud 110 and a local component operating on a local device. These two components can communicate with one another.

Service 105 is generally tasked with generating an infrastructure simulation solution 120, which includes a synthetic network infrastructure 120A. At a high level, the infrastructure simulation solution comprises a number of example steps. One step involves service 105 obtaining a set W of N graph-based workload representations 125, $w_i \in W$. These can be real or synthetic, but typically represent a set of components (e.g., nodes) with a data/communication flow between them (e.g., edges). Each workload graph is a seed from where a synthetic graph expansion will take place. For instance, the workload representations 125 correspond to a workload 125A, which has multiple tasks 125B.

Service 105 also defines the number of inter-seed hops, $H \in Z^+$. This determines how many "layers" of intermediate nodes are to appear between seeds. Service 105 also defines the number of per-hop nodes as a proportion of the size of a given seed, $P \in \{p_{min}, p_{max}\} \in R$.

Service 105 also defines the inter-connectivity probability, $E \in [0, 1]$. This determines the sparsity of the connectivity between nodes as the synthetic graph expands.

Service 105 defines repeat counts for each seed, $R_i \in Z^+$, $I \in \{1, \ldots, N\}$. This determines how many times each seed should appear as subgraphs of the expanded graph. Service 105 also defines $G = \varnothing$ as an empty graph.

The above process may be repeated $\Sigma R_i$ times. For instance, service 105 may randomly pick a seed $w = w_i$ from W according to the seeds' likelihoods as a function of $R_i$. Service 105 adds w to G. Service 105 adds as many layers of nodes around w as determined by H. For each layer, service 105 adds as many nodes as defined by P. For each added node, service 105 connects it to a seed node or a previous layer's node according to E.

By performing these operations, service 105 is able to obtain an infrastructure topology graph, I, with $R_i$ $w_i \in W$. In addition to assembling the topology, additional steps can be executed to assign resource availability and utilization properties to each node of the graph. This graph can then be used in controlled workload placement evaluations where the locations of workload subgraphs are known a priori.

As mentioned above, one motivation for the disclosed principles is the desire to simulate infrastructure topologies that are adequate for the problem of graph-based workload placement. In this problem, a workload is typically represented as a graph when it consists of a set of applications (e.g., nodes) with a data/communication flow between them (e.g., edges). This scenario can be used in microservice(s)-based architectures for the cloud and edge computing. Placing this workload entails finding a location within some computing infrastructure where the set of applications can run while satisfying some constraints.

Computing infrastructures can be naturally represented as graphs. The workload placement problem can thus be addressed as a constrained graph mapping problem. A challenge in the development of placement algorithms is how to test them at scale in controlled ways. It is also beneficial to know if the computing infrastructure can satisfy a placement request via (1) locating a subset of the infrastructure that matches the topology of the workload graph and (2) validating that the resources available in the located subset satisfy the requirements of the workload.

Service 105 addresses the two problems above by allowing the creation of synthetic workload topologies directly from known workload samples. Those samples, referred to as "seeds," are the starting point from where the synthetic infrastructure grows, as illustrated in FIG. 2.

Figure 2:
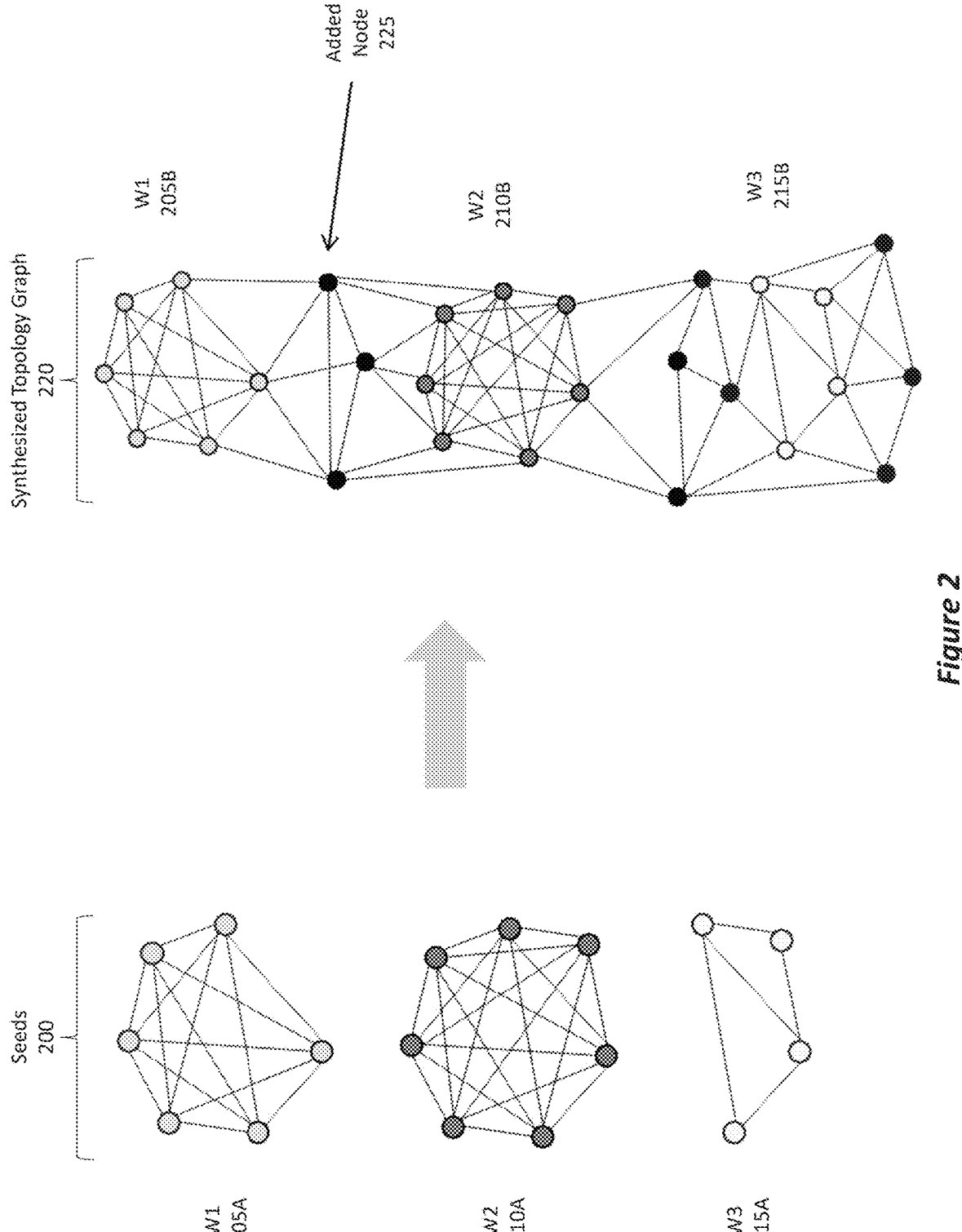
FIG. 2 illustrates how a network infrastructure can be built.

FIG. 2 shows an example scenario involving a number of seeds 200, such as W1 205A, W2 210A, and W3 215A. These seeds 200 (e.g., seed graphs) are used to generate a synthesized topology graph 220 (e.g., a synthetic network topology infrastructure), which includes the seeds 200 and various other nodes. For instance, synthesized topology graph 220 includes W1 205B, which corresponds to W1 205A; W2 210B, which corresponds to W2 210A; and W3 215B, which corresponds to W3 215A. Synthesized topology graph 220 also includes a number of added, or connecting nodes between the different seeds, as shown by added node 225.

The disclosed techniques allow a set of graph-based workloads to be provided to a topology construction algorithm 130, as shown in FIG. 1. The algorithm creates interconnections between the seeds according to parameters that regulate the complexity of the resulting infrastructure graph. In addition to the topology, the algorithm also assigns simulated resource availability, as attributes of the nodes, based on characteristics of the seed workloads. The details of the algorithm are provided below.

Synthetic Topology Creation

The disclosed algorithm employs a constructive logic to add seeds to the topology graph and to connect them. FIGS. 3A and 3B illustrate such logic with two workload seeds (e.g., seed W1 and seed W2 (shown in FIG. 3B)). Starting in FIG. 3A, seed W1 300 is shown.

The algorithm takes as input a parameter that defines the number of layers of nodes to be added around the seed (in this example, the number is 2). These layers are referred to as "hops." In stage A of FIG. 3A, two hops will be added around W1 300, as shown by layer 305 and layer 310. The number of nodes in each hop is also a parameter of the algorithm and is a function of the size of W1 300.

In stage B of FIG. 3A, five nodes were added to each hop, as shown by node 315 to the inner layer and node 320 to the outer layer. Layer by layer, hop nodes are connected with the nodes of the previous layer (the seed workload can be interpreted as "hop 0"). Thus, as shown in stage C of FIG. 3B, the nodes of hop 1 are connected with the nodes of the seed, as shown by connection 325. The nodes of hop 2 are connected with the nodes of hop 1 and so on, as shown by connection 330. The number of edges to be added between each pair of layers is probabilistic and may be defined by another parameter of the algorithm.

Finally, in stage D of FIG. 3B, seed W2 335 is added to the topology. The nodes of W2 335 are connected with the last hop of the previous seed (hop 2) following the same probabilistic edge creation. The algorithm guarantees that at least one node from each hop is connected to the previous one. Therefore, as shown in FIGS. 3A and 3B, the embodiments support constructive logic of the synthetic topology creation, with two layers of hop nodes between seeds.

Figure 4:
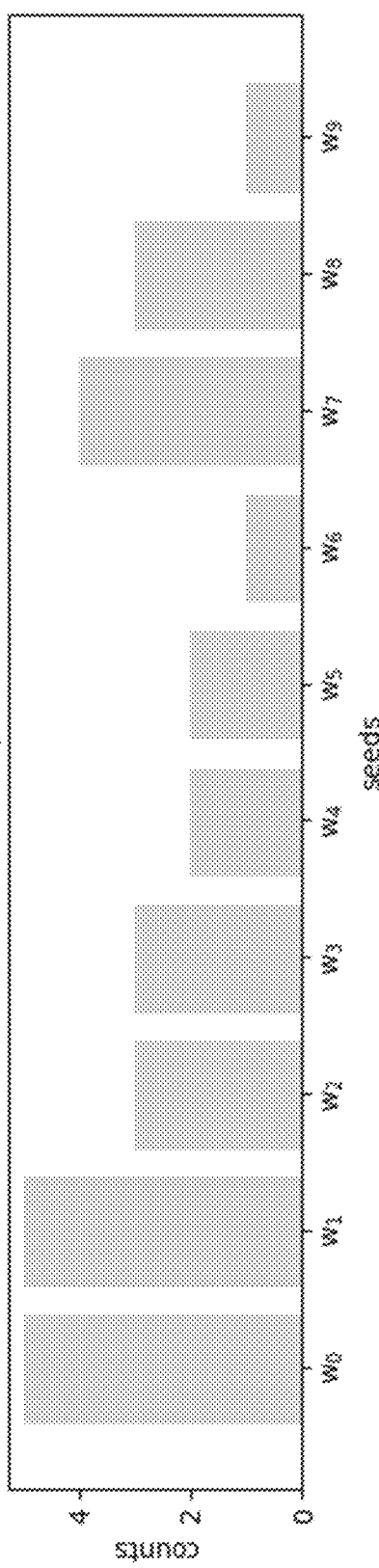
FIG. 4 illustrates various seed frequencies.

As mentioned previously, the embodiments start from a given set W with N workload seeds. The elements $w_i \in W$ are added to the topology (e.g., perhaps randomly), following the probability distribution defined by another parameter that determines how many times each element should appear in the final topology. This is illustrated in FIG. 4, as shown by seed frequencies 400. The probability distribution is obtained by normalizing the counts to sum 1. Each time one element is picked from the set, its count is reduced by 1 and the distribution is recalculated for the next round.

With the intuition given above, the actual topology creation algorithm can then be performed. The algorithm receives as input the seeds to be added, its attributes (e.g., resource availability of each node, probability of link failures, etc.), the frequency of occurrence of each seed, the number of hops between seeds, the parameter that determines the number of nodes to add per hop, the probability of adding an edge connecting two nodes, and a function that sets the attributes of added edges.

In some cases, the embodiments can randomly assign a probability of dropping a given connection. This may be used by the workload placement algorithm to evaluate the health status of the connections between nodes when choosing candidates for the placement.

The algorithm begins by initializing an empty graph and by computing the number of nodes in each seed. Next, it starts the loop that randomly adds the seeds until all of them are removed from the initial set. Optionally, seeds are picked randomly from the initial set, so the embodiments can first compute the seed probabilities based on their repeat counts.

After retrieving a random seed from the set, the embodiments proceed to add it to the final graph, along with the attributes of their nodes. Typically, programming libraries for graph manipulation require that nodes of a graph have unique labels. Thus, some logic can be used to make sure that seed nodes are properly identified in the final graph.

Subsequently, the seed is connected to the last layer of hop nodes if such layer exists. Each node of the recently added seed is connected to each node of the previous layer based on the probability of adding an edge between nodes. If, by chance, no edges are added, the embodiments can randomly pick one node from the previous layer to guarantee that every seed node has at least one point of contact with it. When an edge is added, its attributes are set via the provided edge attribute function.

In the next loop, the embodiments add layers of nodes around the added seed, as explained previously. The number of nodes is defined as a proportion of the size of the seed, where this proportion is given as a parameter of the creation function. The previous layer is initialized with the nodes of the recently added seed. In the loop, hop nodes are added one by one with the proper label. For each node, the embodiments add edges to the nodes of the previous layer based on the same probability of connection used above. The embodiments can also guarantee that the node is connected to at least one node of the previous layer if, by chance, none is selected. At the end of each iteration, the previous layer of nodes is updated with the layer just created.

After completing the steps for the recently added seed, its count is updated in the frequency of occurrence parameter. From there, the seed probabilities are updated, another seed is picked randomly from the remaining set, and the same steps are executed. Finally, the topology graph, G, is returned.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
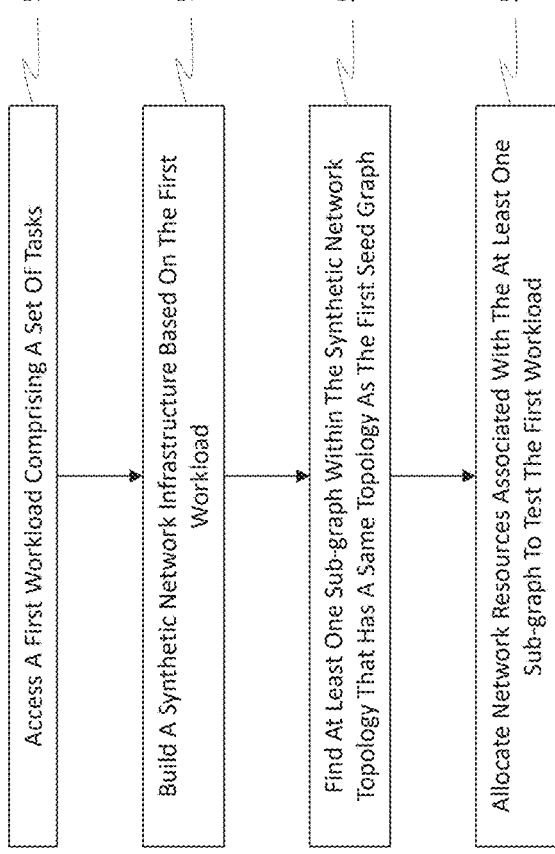
FIG. 5 illustrates an example method for building a network infrastructure.

Attention will now be directed to FIG. 5, which illustrates a flowchart of an example method 500 for generating a synthetic network infrastructure. Method 500 can be implemented within architecture 100 of FIG. 1. Method 500 can be performed by service 105.

Method 500 includes an act (act 505) of accessing a first workload comprising a set of tasks. Any number of tasks may be included in this first workload. Often the first workload can be viewed as being an atomic workload, where the various tasks communicate with one another.

Act 510 includes building a synthetic network infrastructure based on the first workload. The process of building the synthetic network infrastructure includes a number of acts, which are outlined in the process flow 600 of FIG. 6.

For instance, as shown in FIG. 6, act 605 includes representing the first workload as a first seed graph. This first seed graph includes at least one layer of seed nodes. The graph W1 300 in FIG. 3A is illustrative of this first seed graph.

Act 610 includes growing a topology infrastructure around the first seed graph by progressively adding one or more hop layers to the first seed graph, as shown in stage A, stage B, stage C, and stage D of FIGS. 3A and 3B. Each newly added hop layer has a corresponding number of hop nodes. Also, each newly added hop node is connected to an existing node (whether that is an original seed node or a previously added hop node) in the topology infrastructure. The topology infrastructure includes an outermost layer comprising an outermost hop node.

In some cases, the topology infrastructure is grown based on a layer parameter, where the layer parameter defines a number of layers that are to be progressively added to the first seed graph. Any number of layers can be added.

Optionally, the one or more hop layers are added to the topology infrastructure in a random manner. For instance, the number of hop nodes within each layer may be randomly selected. Similarly, the number of layers that are added may be randomly selected. In some cases, the number of connections may be randomly selected. Also, the way in which those connections are made may be randomly selected.

In some cases, the topology infrastructure is grown based on a node parameter, where the node parameter defines a number of nodes that are to be added to each layer that is added to the first seed graph. Any number of nodes can be added. In some cases, the topology infrastructure is grown based on a connection parameter, where the connection parameter defines a number of connections that are to be added between each newly added hop layer and an inner layer of the topology infrastructure. Any number of connections can be added.

In some cases, the one or more hop layers that are progressively added to the first seed graph includes a first hop layer and a second hop layer. In some cases, more than two layers can be added. In some cases, the one or more hop layers includes a first hop layer with a first set of hop nodes. Each of the hop nodes in the first set may be connected to at least one seed node of an outer layer of the first seed graph. Optionally, each seed node of the outer layer of the first seed graph may be connected to at least one hop node from the first set of hop nodes.

In some cases, the one or more hop layers includes a first hop layer and a second hop layer. The first hop layer may include a first set of hop nodes, and the second hop layer may include a second set of hop nodes. The first set of hop nodes may be connected to seed nodes of the first seed graph, and the second set of hop nodes may be connected to the first set of hop nodes. Optionally, no seed nodes of the first seed graph are connected to the second set of hop nodes. Thus, the first set of hop nodes serve as intermediary nodes between the seed nodes and the second set of hop nodes.

Returning to FIG. 6, act 615 includes connecting the outermost hop node of the topology infrastructure to a different node associated with a second topology infrastructure that has been grown for a second workload, resulting in generation of the synthetic network infrastructure. Optionally, the different node associated with the second topology infrastructure may be a corresponding seed node of the second workload or, alternatively, may be a corresponding hop node of the second workload.

Returning to FIG. 5, act 515 includes finding at least one sub-graph within the synthetic network topology that has a same topology as the first seed graph. For instance, FIG. 2 shows how a sub-graph in the synthesized topology graph 220 (e.g., consider W1 205B) has the same topology as the seed W1 205A.

Act 520 then includes allocating network resources associated with the at least one sub-graph to test the first workload. For instance, W1 205B in FIG. 2 may be allocated to process or execute the seed W1 205A.

With the algorithm presented herein, the embodiments are able to easily experiment with various topology and workload combinations. By knowing the number and location of seed workloads in the synthesized infrastructure topology, the embodiments can run a sub-graph matching algorithm and can compute metrics such as the success rate of placements, the time it takes to allocate workloads with different topology and workload sizes. The embodiments can also beneficially simulate network bandwidth and link health between nodes.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
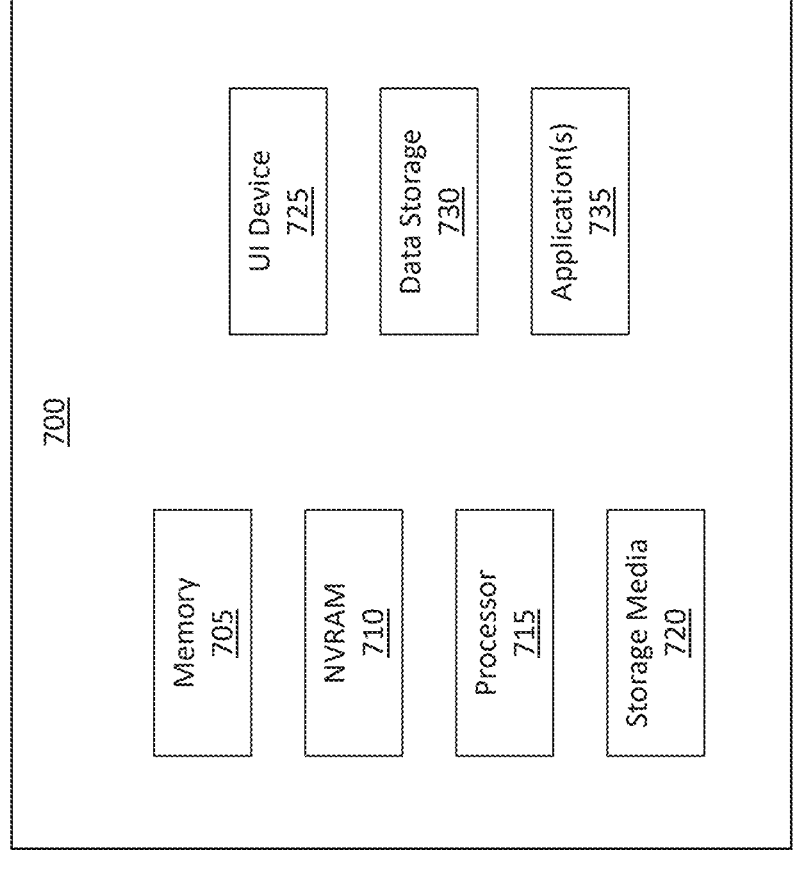
FIG. 7 illustrates an example computer system that can be configured to perform any of the disclosed operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. Also, where any of the aforementioned elements comprise or consist of a virtual machine (VM), that VM may constitute a virtualization of any combination of the physical components disclosed in FIG. 7. Device 700 can implement the architecture 100 of FIG. 1.

In the example of FIG. 7, the physical computing device 700 includes a memory 705 which may include one, some, or all, of random access memory (RAM), non-volatile memory (NVM) 710 such as NVRAM for example, read-only memory (ROM), and persistent memory, one or more hardware processors 715, non-transitory storage media 720, UI device 725, and data storage 730. One or more of the memory 705 of the physical computing device 700 may take the form of solid-state device (SSD) storage. Also, one or more applications 735 may be provided that comprise instructions executable by one or more hardware processors 715 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 700 may also be representative of an edge system, a cloud-based system, a datacenter or portion thereof, or other system or entity.

The disclosed embodiments can be implemented in numerous different ways, as described in the various different clauses recited below.

Clause 1. A method comprising: accessing a first workload comprising a set of tasks; building a synthetic network infrastructure based on the first workload, wherein building the synthetic network infrastructure includes: representing the first workload as a first seed graph that includes at least one layer of seed nodes; growing a topology infrastructure around the first seed graph by progressively adding one or more hop layers to the first seed graph, wherein each newly added hop layer has a corresponding number of hop nodes, wherein each newly added hop node is connected to an existing node in the topology infrastructure, and wherein the topology infrastructure includes an outermost layer comprising an outermost hop node; and connecting the outermost hop node of the topology infrastructure to a different node associated with a second topology infrastructure that has been grown for a second workload, resulting in generation of the synthetic network infrastructure; finding at least one sub-graph within the synthetic network topology that has a same topology as the first seed graph; and allocating network resources associated with the at least one sub-graph to test the first workload.

Clause 2. The method of any of the preceding clauses, wherein the topology infrastructure is grown based on a layer parameter, the layer parameter defining a number of layers that are to be progressively added to the first seed graph.

Clause 3. The method of the preceding clauses, wherein the topology infrastructure is grown based on a node parameter, the node parameter defining a number of nodes that are to be added to each layer that is added to the first seed graph.

Clause 4. The method of the preceding clauses, wherein the one or more hop layers that are progressively added to the first seed graph includes a first hop layer and a second hop layer.

Clause 5. The method of the preceding clauses, wherein the different node associated with the second topology infrastructure is a corresponding seed node of the second workload.

Clause 6. The method of the preceding clauses, wherein the different node associated with the second topology infrastructure is a corresponding hop node of the second workload.

Clause 7. The method of the preceding clauses, wherein the one or more hop layers includes a first hop layer with a first set of hop nodes, and wherein each of the hop nodes in the first set is connected to at least one seed node of an outer layer of the first seed graph.

Clause 8. The method of the preceding clauses, wherein each seed node of the outer layer of the first seed graph is connected to at least one hop node from the first set of hop nodes.

Clause 9. The method of the preceding clauses, wherein the one or more hop layers includes a first hop layer and a second hop layer, the first hop layer includes a first set of hop nodes and the second hop layer includes a second set of hop nodes, wherein the first set of hop nodes are connected to seed nodes of the first seed graph, wherein the second set of hop nodes are connected to the first set of hop nodes, and wherein no seed nodes of the first seed graph are connected to the second set of hop nodes.

Clause 10. The method of the preceding clauses, wherein the topology infrastructure is grown based on a connection parameter, the connection parameter defining a number of connections that are to be added between each newly added hop layer and an inner layer of the topology infrastructure.

Clause 11. A computer system comprising: one or more processors; and one or more hardware storage devices that store instructions that are executable by the one or more processors to cause the computer system to: access a first workload comprising a set of tasks; build a synthetic network infrastructure based on the first workload, wherein building the synthetic network infrastructure includes: representing the first workload as a first seed graph that includes at least one layer of seed nodes; growing a topology infrastructure around the first seed graph by progressively adding one or more hop layers to the first seed graph, wherein each newly added hop layer has a corresponding number of hop nodes, wherein each newly added hop node is connected to an existing node in the topology infrastructure, and wherein the topology infrastructure includes an outermost layer comprising an outermost hop node; and connecting the outermost hop node of the topology infrastructure to a different node associated with a second topology infrastructure that has been grown for a second workload, resulting in generation of the synthetic network infrastructure; find at least one sub-graph within the synthetic network topology that has a same topology as the first seed graph; and allocate network resources associated with the at least one sub-graph to test the first workload.

Clause 12. The computer system of the preceding clauses, wherein the one or more hop layers are added to the topology infrastructure in a random manner.

Clause 13. The computer system of the preceding clauses, wherein the topology infrastructure is grown based on a layer parameter, the layer parameter defining a number of layers that are to be progressively added to the first seed graph.

Clause 14. The computer system of the preceding clauses, wherein the topology infrastructure is grown based on a node parameter, the node parameter defining a number of nodes that are to be added to each layer that is added to the first seed graph.

Clause 15. The computer system of the preceding clauses, wherein the topology infrastructure is grown based on a connection parameter, the connection parameter defining a number of connections that are to be added between each newly added hop layer and an inner layer of the topology infrastructure.

Clause 16. The computer system of the preceding clauses, wherein the different node associated with the second topology infrastructure is a corresponding seed node of the second workload.

Clause 17. The computer system of the preceding clauses, wherein the different node associated with the second topology infrastructure is a corresponding hop node of the second workload.

Clause 18. One or more hardware storage devices that store instructions that are executable by one or more processors to cause the one or more processors to: access a first workload comprising a set of tasks; build a synthetic network infrastructure based on the first workload, wherein building the synthetic network infrastructure includes: representing the first workload as a first seed graph that includes at least one layer of seed nodes; growing a topology infrastructure around the first seed graph by progressively adding one or more hop layers to the first seed graph, wherein each newly added hop layer has a corresponding number of hop nodes, wherein each newly added hop node is connected to an existing node in the topology infrastructure, and wherein the topology infrastructure includes an outermost layer comprising an outermost hop node; and connecting the outermost hop node of the topology infrastructure to a different node associated with a second topology infrastructure that has been grown for a second workload, resulting in generation of the synthetic network infrastructure; find at least one sub-graph within the synthetic network topology that has a same topology as the first seed graph; and allocate network resources associated with the at least one sub-graph to test the first workload.

Clause 19. The one or more hardware storage devices of the preceding clauses, wherein the one or more hop layers are added to the topology infrastructure in a random manner.

Clause 20. The one or more hardware storage devices of the preceding clauses, wherein the topology infrastructure is grown based on a layer parameter, the layer parameter defining a number of layers that are to be progressively added to the first seed graph.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

performing, by at least one processor:

accessing a first workload comprising a set of tasks;

building a synthetic network infrastructure based on the first workload, wherein building the synthetic network infrastructure includes:

representing the first workload as a first seed graph that includes at least one layer of seed nodes;

growing a topology infrastructure around the first seed graph by progressively adding one or more hop layers to the first seed graph, wherein each newly added hop layer has a corresponding number of hop nodes, wherein each newly added hop node is connected to an existing node in the topology infrastructure, and wherein the topology infrastructure includes an outermost layer comprising an outermost hop node; and connecting the outermost hop node of the topology infrastructure to a different node associated with a second topology infrastructure that has been grown for a second workload, resulting in generation of the synthetic network infrastructure;

finding at least one sub-graph within the synthetic network topology that has a same topology as the first seed graph;

allocating network resources associated with the at least one sub-graph to test the first workload;

testing the at least one sub-graph of the synthetic network topology using the first workload; and placing workloads in a network based on the testing.

2. The method of claim 1, wherein the topology infrastructure is grown based on a layer parameter, the layer parameter defining a number of layers that are to be progressively added to the first seed graph.

3. The method of claim 1, wherein the topology infrastructure is grown based on a node parameter, the node parameter defining a number of nodes that are to be added to each layer that is added to the first seed graph.

4. The method of claim 1, wherein the one or more hop layers that are progressively added to the first seed graph includes a first hop layer and a second hop layer.

5. The method of claim 1, wherein the different node associated with the second topology infrastructure is a corresponding seed node of the second workload.

6. The method of claim 1, wherein the different node associated with the second topology infrastructure is a corresponding hop node of the second workload.

7. The method of claim 1, wherein the one or more hop layers includes a first hop layer with a first set of hop nodes, and wherein each of the hop nodes in the first set is connected to at least one seed node of an outer layer of the first seed graph.

8. The method of claim 7, wherein each seed node of the outer layer of the first seed graph is connected to at least one hop node from the first set of hop nodes.

9. The method of claim 1, wherein the one or more hop layers includes a first hop layer and a second hop layer, the first hop layer includes a first set of hop nodes and the second hop layer includes a second set of hop nodes, wherein the first set of hop nodes are connected to seed nodes of the first seed graph, wherein the second set of hop nodes are connected to the first set of hop nodes, and wherein no seed nodes of the first seed graph are connected to the second set of hop nodes.

10. The method of claim 1, wherein the topology infrastructure is grown based on a connection parameter, the connection parameter defining a number of connections that are to be added between each newly added hop layer and an inner layer of the topology infrastructure.

11. A computer system comprising:

one or more processors; and one or more hardware storage devices that store instructions that are executable by the one or more processors to cause the computer system to:

access a first workload comprising a set of tasks;

US 12,562,974 B2

13 build a synthetic network infrastructure based on the first workload, wherein building the synthetic network infrastructure includes:

representing the first workload as a first seed graph that includes at least one layer of seed nodes;

growing a topology infrastructure around the first seed graph by progressively adding one or more hop layers to the first seed graph, wherein each newly added hop layer has a corresponding number of hop nodes, wherein each newly added hop node is connected to an existing node in the topology infrastructure, and wherein the topology infrastructure includes an outermost layer comprising an outermost hop node; and connecting the outermost hop node of the topology infrastructure to a different node associated with a second topology infrastructure that has been grown for a second workload, resulting in generation of the synthetic network infrastructure;

find at least one sub-graph within the synthetic network topology that has a same topology as the first seed graph;

allocate network resources associated with the at least one sub-graph to test the first workload;

test the at least one sub-graph of the synthetic network topology using the first workload; and place workloads in a network based on the testing.

12. The computer system of claim 11, wherein the one or more hop layers are added to the topology infrastructure in a random manner.

13. The computer system of claim 11, wherein the topology infrastructure is grown based on a layer parameter, the layer parameter defining a number of layers that are to be progressively added to the first seed graph.

14. The computer system of claim 11, wherein the topology infrastructure is grown based on a node parameter, the node parameter defining a number of nodes that are to be added to each layer that is added to the first seed graph.

15. The computer system of claim 11, wherein the topology infrastructure is grown based on a connection parameter, the connection parameter defining a number of connections that are to be added between each newly added hop layer and an inner layer of the topology infrastructure.

16. The computer system of claim 11, wherein the different node associated with the second topology infrastructure is a corresponding seed node of the second workload.

17. The computer system of claim 11, wherein the different node associated with the second topology infrastructure is a corresponding hop node of the second workload.

18. One or more hardware storage devices that store instructions that are executable by one or more processors to cause the one or more processors to:

access a first workload comprising a set of tasks;

build a synthetic network infrastructure based on the first workload, wherein building the synthetic network infrastructure includes:

representing the first workload as a first seed graph that includes at least one layer of seed nodes;

grow a topology infrastructure around the first seed graph by progressively adding one or more hop layers to the first seed graph, wherein each newly added hop layer has a corresponding number of hop nodes, wherein each newly added hop node is connected to an existing node in the topology infrastructure, and wherein the topology infrastructure includes an outermost layer comprising an outermost hop node; and connect the outermost hop node of the topology infrastructure to a different node associated with a second topology infrastructure that has been grown for a second workload, resulting in generation of the synthetic network infrastructure;

find at least one sub-graph within the synthetic network topology that has a same topology as the first seed graph; and allocate network resources associated with the at least one sub-graph to test the first workload test the at least one sub-graph of the synthetic network topology using the first workload; and place workloads in a network based on the testing.

19. The one or more hardware storage devices of claim 18, wherein the one or more hop layers are added to the topology infrastructure in a random manner.

20. The one or more hardware storage devices of claim 18, wherein the topology infrastructure is grown based on a layer parameter, the layer parameter defining a number of layers that are to be progressively added to the first seed graph.

* * * * *